(12) United States Patent
Lockhart (10) Patent No.: US 7,392,804 B2
(45) Date of Patent: Jul. 1, 2008

(54) AUTOMATED OPENING/CLOSING APPARATUS AND METHOD FOR A CONTAINER HAVING A HINGED LID

(76) Inventor: Chris A. Lockhart, 1888 Cedar La., Acworth, GA (US) 30102

( * ) Notice: Subject to any disclaimer, the term of this patent is extended or adjusted under 35 U.S.C. 154(b) by 338 days.

(21) Appl. No.: 11/126,586

(22) Filed: May 11, 2005

(65) Prior Publication Data

US 2006/0102165 A1 May 18, 2006

Related U.S. Application Data

(60) Provisional application No. 60/627,921, filed on Nov. 15, 2004.

(51) Int. Cl.
*A47J 36/06* (2006.01)
(52) U.S. Cl. .................. 126/192; 126/286; 220/263
(58) Field of Classification Search .................. 126/192, 126/190, 25 R, 286; 110/178; 220/263, 220/264, 262, 260
See application file for complete search history.

(56) References Cited

U.S. PATENT DOCUMENTS

| | | | | |
|---|---|---|---|---|
| 3,085,562 A | * | 4/1963 | Persinger et al. | 126/25 R |
| 4,852,545 A | * | 8/1989 | Sherman et al. | 126/39 H |
| 5,341,727 A | * | 8/1994 | Dickson | 99/335 |
| 5,453,736 A | * | 9/1995 | Noren | 340/5.6 |
| 5,918,588 A | * | 7/1999 | Gil Garcia | 126/41 R |
| 6,418,923 B1 | | 7/2002 | Cantrell | |
| 6,519,130 B1 | * | 2/2003 | Breslow | 361/170 |
| 6,581,587 B1 | | 6/2003 | Helms | |
| 6,789,537 B1 | | 9/2004 | Lutz et al. | |
| 2004/0257020 A1 | * | 12/2004 | Boliver | 318/480 |

FOREIGN PATENT DOCUMENTS

JP 2005-9693 A * 1/2005

* cited by examiner

*Primary Examiner*—Steven B. McAllister
*Assistant Examiner*—Sarah Suereth
(74) *Attorney, Agent, or Firm*—Gardner Groff Greenwald & Villanueva, PC (57) ABSTRACT

An actuator moves the hinged lid of a cooking grill or similar container between a closed position and an opened position when an electronic sensor detects the approach of a person. For example, the actuator can open the lid when a person approaches, and then close the lid at a later time, such as when the person activates a switch or leaves the area, or after a time interval.

15 Claims, 7 Drawing Sheets

AUTOMATED OPENING/CLOSING APPARATUS AND METHOD FOR A CONTAINER HAVING A HINGED LID

CROSS-REFERENCE TO RELATED APPLICATION

The benefit of U.S. Provisional Patent Application Ser. No. 60/627,921, filed Nov. 15, 2004, entitled "AUTOMATED OPENING/CLOSING APPARATUS AND METHOD FOR A CONTAINER HAVING A HINGED LID," is hereby claimed, and the specification thereof incorporated herein by this reference.

BACKGROUND OF THE INVENTION

1. Field of the Invention

The present invention relates generally to the field of automated opening and closing mechanisms and, more particularly, to an automated opening/closing system for a cooking grill or similar container having a hinged lid.

2. Description of the Related Art

An outdoor cooking grill, also commonly referred to as a "barbecue grill," "barbecue," or simply "grill," may include a hinged lid that covers the cooking surface. A hinged lid is a particularly common feature of grills fueled by propane and natural gas, though other grills may have lids as well. Many persons who enjoy cooking on a grill find it awkward to open the grill lid while carrying a plate of food and cooking utensils. Thus, it can be seen that needs exist for a hands-free way of opening and closing a grill with a hinged lid. It is to such an apparatus and method that the present invention is directed.

SUMMARY OF THE INVENTION

The present invention relates to an apparatus and method for automatically moving a hinged lid of a cooking grill or similar container between an opened and closed position, i.e., from a closed position to an opened position in some embodiments of the invention, from an open position to a closed position in other embodiments, or in both directions in still other embodiments. The apparatus includes an actuator system and a controller system.

The actuator system is mountable to the grill and has a means for transmitting motion to the lid, such as an arm, a system of cables and pulleys, sprockets and chains, a linear actuator, a threaded rod and ball nut, etc., or combinations thereof. The controller system has an electronic sensor, which may be of a photoelectric, optical, ultrasonic, infrared, microwave, inductive, or other suitable type, which senses the approach of a user (or object the user is carrying) to the grill and, in response, triggers the actuator system to move the lid from one position to the other, most preferably from the closed position to the open position. In some embodiments of the invention, a user-operated control, such as a foot pedal or a switch, can further be included to trigger the actuator system to move the lid in the other direction, such as from the open position back to the closed position, or alternatively, in other embodiments, as a manual override to trigger the actuator system to move the lid in the same direction as if triggered by the sensor. In still other embodiments, the controller system can close the lid in response to other conditions, such as when the sensor senses the user has left the area or after a predetermined amount of time has elapsed since the grill lid opened.

BRIEF DESCRIPTION OF THE DRAWINGS

FIG. 3 is side elevational view similar to FIG. 2 but from the opposite side of the grill and showing the lid in an opened position.

DETAILED DESCRIPTION

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

Figure 1:
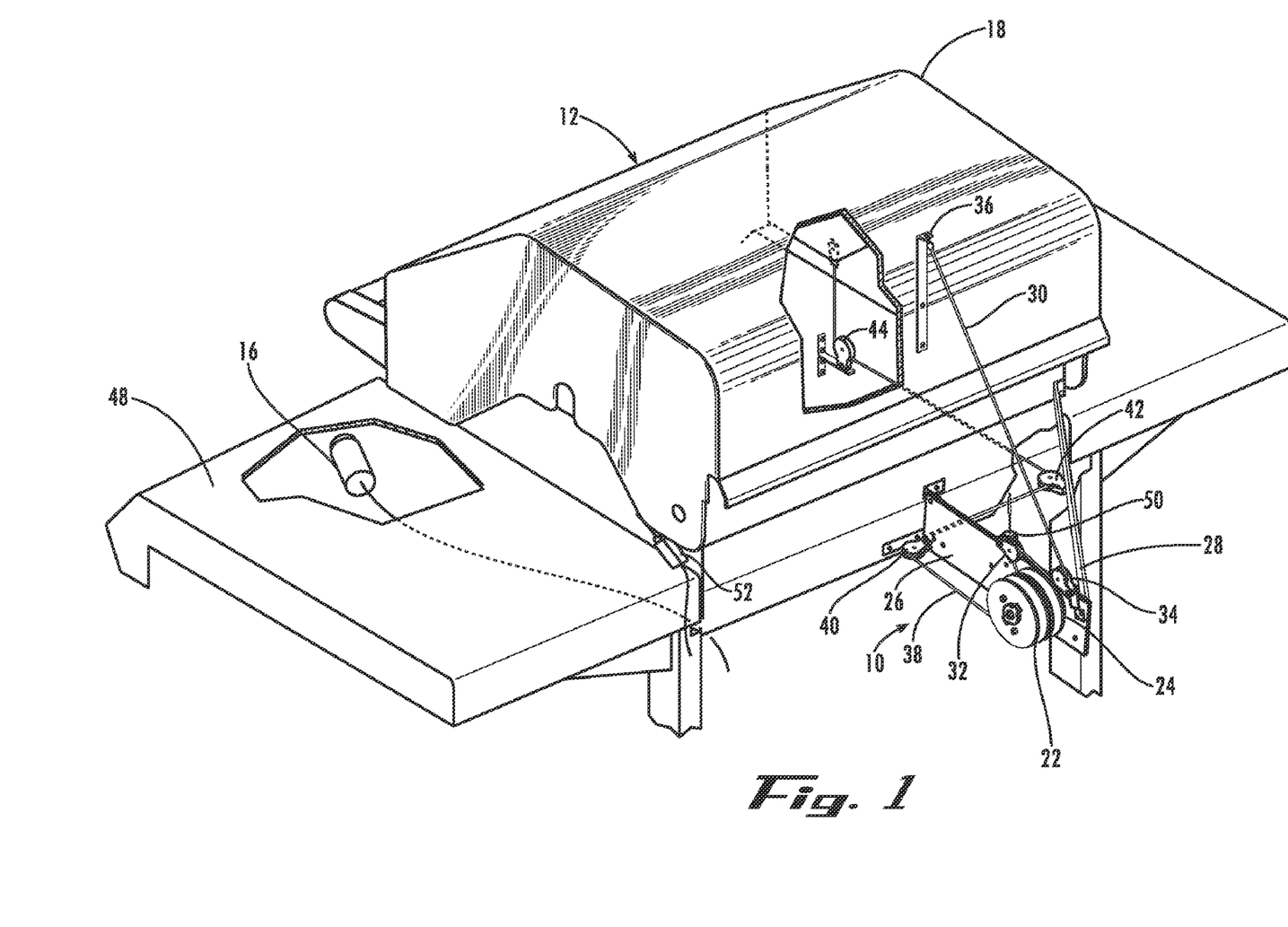
FIG. 1 is perspective view of a grill with an attached apparatus for opening and closing the grill lid in accordance with one embodiment of the present invention.

As illustrated in FIG. 1, an actuator system 10 is mounted to a grill 12 and electrically connected to a controller system 14 (FIG. 7, described below) that includes an electronic sensor 16, such as a photoelectric eye. Grill 12 has a hinged lid 18, shown in a closed position in FIG. 1. As described in further detail below, controller system 14 causes actuator system 10 to move lid 18 to an open position, as shown in FIG. 3, when electronic sensor 16 detects a person near grill 12.

Actuator system 10 includes a suitable motor 20 (best shown in FIG. 3), such as a reversible 12 VDC gearmotor, with a shaft coupled to two drive pulleys 22 and 24. Motor 20 and associated pulleys 22 and 24 are mounted to a bracket 26, which in turn is bolted to the rear of grill 12. Because the rear of grill 12 can be expected to become hot during use, the fastening hardware used to attach bracket 26 to grill 12 can include suitable insulating materials such as ceramic washers (not shown for purposes of clarity). A second bracket 28 can also be included to stabilize bracket 26. Some or all of the above-described elements, such as motor 20 and associated pulleys 22 and 24 can be enclosed in a safety enclosure or shroud (not shown for purposes of clarity). The enclosure, bracket 26, and other such elements can be made of aluminum, stainless steel or other suitable material for corrosion resistance.

One end of a first cable 30 is taken up by pulley 24, and the other end is routed via two idler pulleys 32 and 34 to an end of an elongated stainless steel bracket 36 attached to an upper portion of the rear of lid 18. One end of a second cable 38 is taken up by pulley 22 and routed via three idler pulleys 40, 42 and 44 to a clevis 46 (best shown in FIG. 3) attached to a lower portion of the front of lid 18. Cables 30 and 38 can comprise, for example, $1/16$-inch diameter stainless steel wire rope, and the other elements can similarly be made of stainless steel for corrosion resistance, with suitable insulating washers included in the attaching hardware. Note that in other embodiments of the invention, the elements of actuator system 10, including the motor, cables and any associated drive pulleys, idler pulleys, etc., can be arranged and mounted in any other suitable manner.

Electronic sensor 16 is mounted to grill 12 in a location suitable for detecting the approach of a person. For example, in the illustrated embodiment of the invention it is mounted beneath the shelf 48 with a small bracket (not shown for purposes of clarity). Electronic sensor 16 can be a photoelectric eye of the type known in the art as "diffuse," which acts as a photoswitch in response to changes in light reaching it caused by a person in close proximity (e.g., approximately 24-36 inches). Electronic sensor 16 is positioned high enough to avoid activation by a family pet or small child. Although in the illustrated embodiment of the invention electronic sensor 16 is of photoelectric technology, in other embodiments it can be of any other suitable technology and can be mounted in any other suitable location. For example, a pressure mat switch can be activated when a user steps on it in front of the grill.

Figure 2:
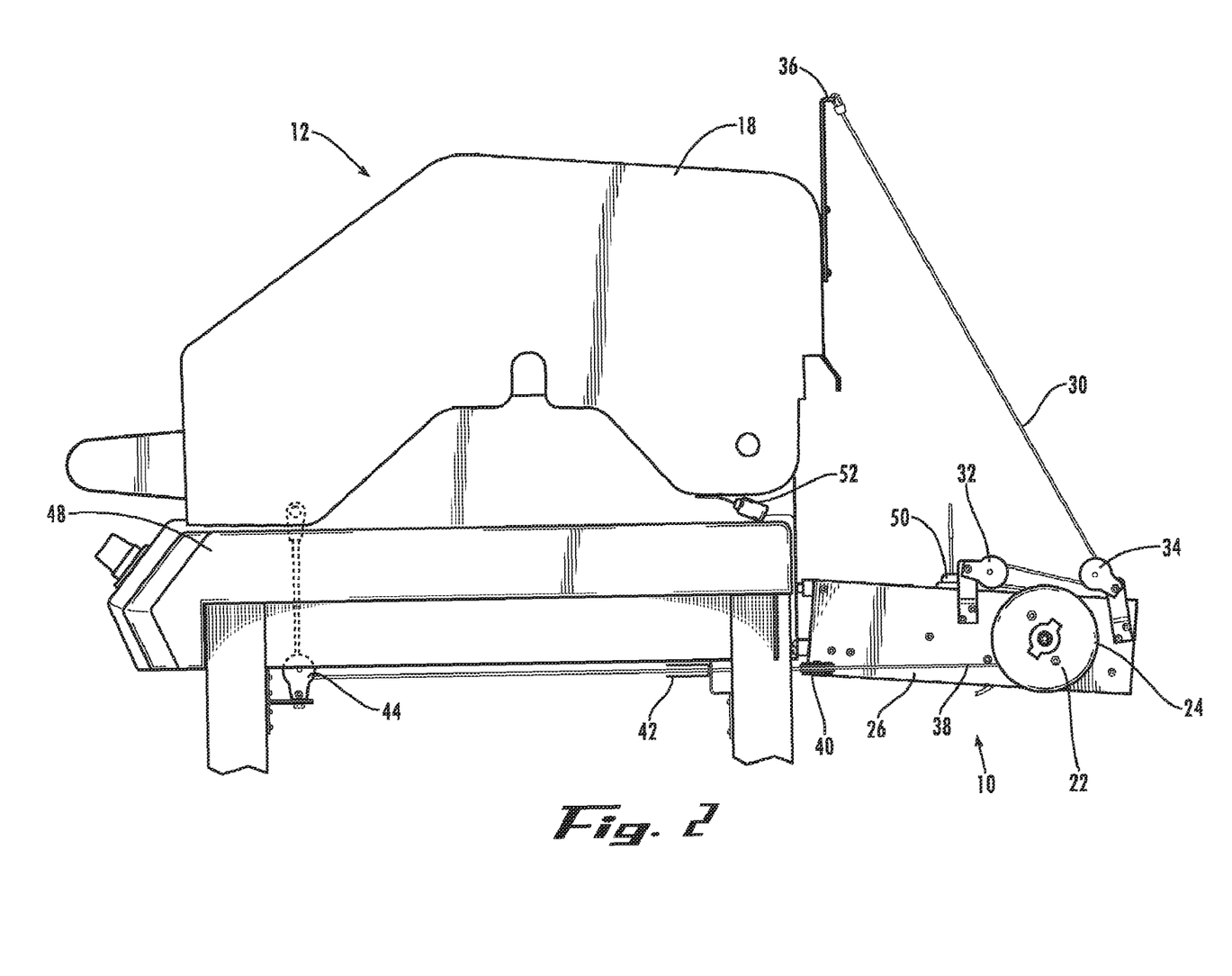
FIG. 2 is a side elevational view of the grill and attached apparatus of FIG. 1, shown without the foot pedal.

Controller system 14 further includes two DPDT wobble-stick-type limit switches 50 and 52. When lid 18 is in the fully closed position (see FIGS. 1-2), limit switch 52 is engaged by contact with lid 18. When lid 18 is in the fully opened position (see FIG. 3) limit switch 50 is engaged by contact with lid 18. In positions between these two positions, both switches 50 and 52 are disengaged.

Figure 7:
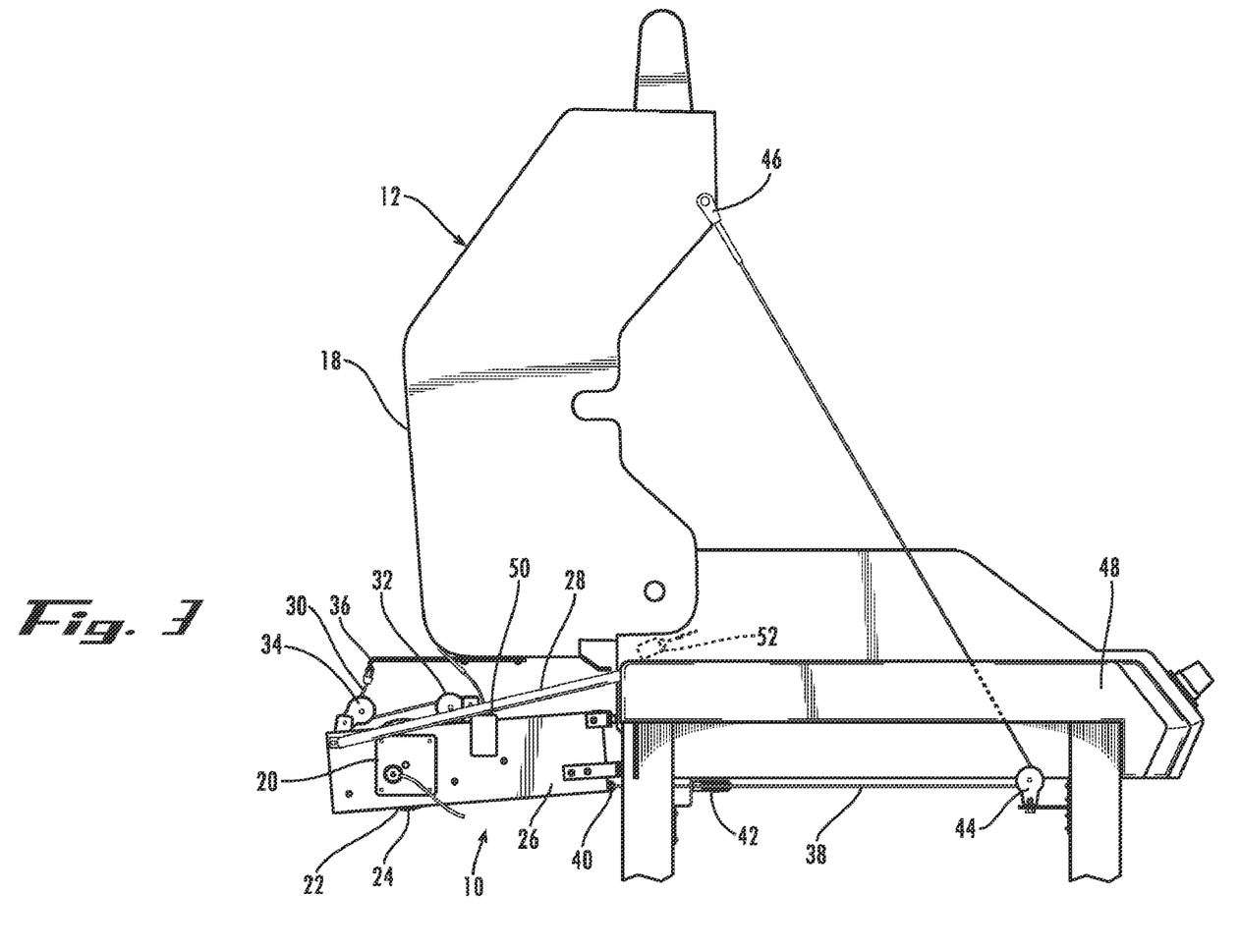
FIG. 7 is schematic diagram of a circuit for controlling the opening and closing of the lid.

As illustrated in FIG. 7, controller system 14 includes, in addition to above-described electronic sensor 16 and switches 50 and 52: a 4-pole relay 54, a single-pole relay 56, and two latching relays 58 and 60. A 12 VDC battery 62 and a supplemental DC power supply 64 of the type that can be plugged into a standard electrical wall outlet (not shown) provide power to controller system 14 and motor 20. A fuse 65 can also be included for protection. Controller system 14 can further include a manually operated override switch 66 that can be used to turn the entire system off so that lid 18 does not automatically open. In addition, controller system 14 can include a foot pedal switch 68 for causing lid 18 to close. Foot pedal switch 68 can be pneumatically activated, with an air tube (not shown) connecting a pneumatic pedal 90 on the ground to the electrical contact portion of the switch, which can be located with relays 54-60 and any other electronic components in a suitable enclosure (not shown) mounted in a suitable location on grill 12.

In operation, when a user approaches grill 12, electronic sensor 16 activates the above-described relay circuitry. In response, the circuitry powers motor 20 in a direction that reels in some of cable 30 and correspondingly reels out some of cable 38. Cable 30 pulls on bracket 36, causing lid 18 to open. When lid 18 reaches the fully opened position, it engages limit switch 50, which causes the circuitry to cease powering motor 20. Preferably, lid 18 takes no more than about three seconds to reach the fully opened position after sensor 16 is activated. Motor 20 remains in the fully opened position until the user depresses foot pedal switch 68. In response, the circuitry powers motor 20 in the opposite direction, thereby reeling in some of cable 38 and correspondingly reeling out some of cable 30. The action of cables 30 and 38 causes lid 18 to close. When lid 18 reaches the fully closed position, it engages limit switch 52, which causes the circuitry to cease powering motor 20. Although in the illustrated embodiment of the invention a foot pedal switch is used to cause lid 18 to close, in other embodiments the lid can be closed in any other suitable way, such as in response to a timer circuit. For example, the sensor can detect when the user is no longer near the grill, and the circuitry can cause the lid to close a minute or two thereafter. Additionally, the user can manually open lid 18 (e.g., if electrical power is lost) and manually close lid 18.

Figure 4:
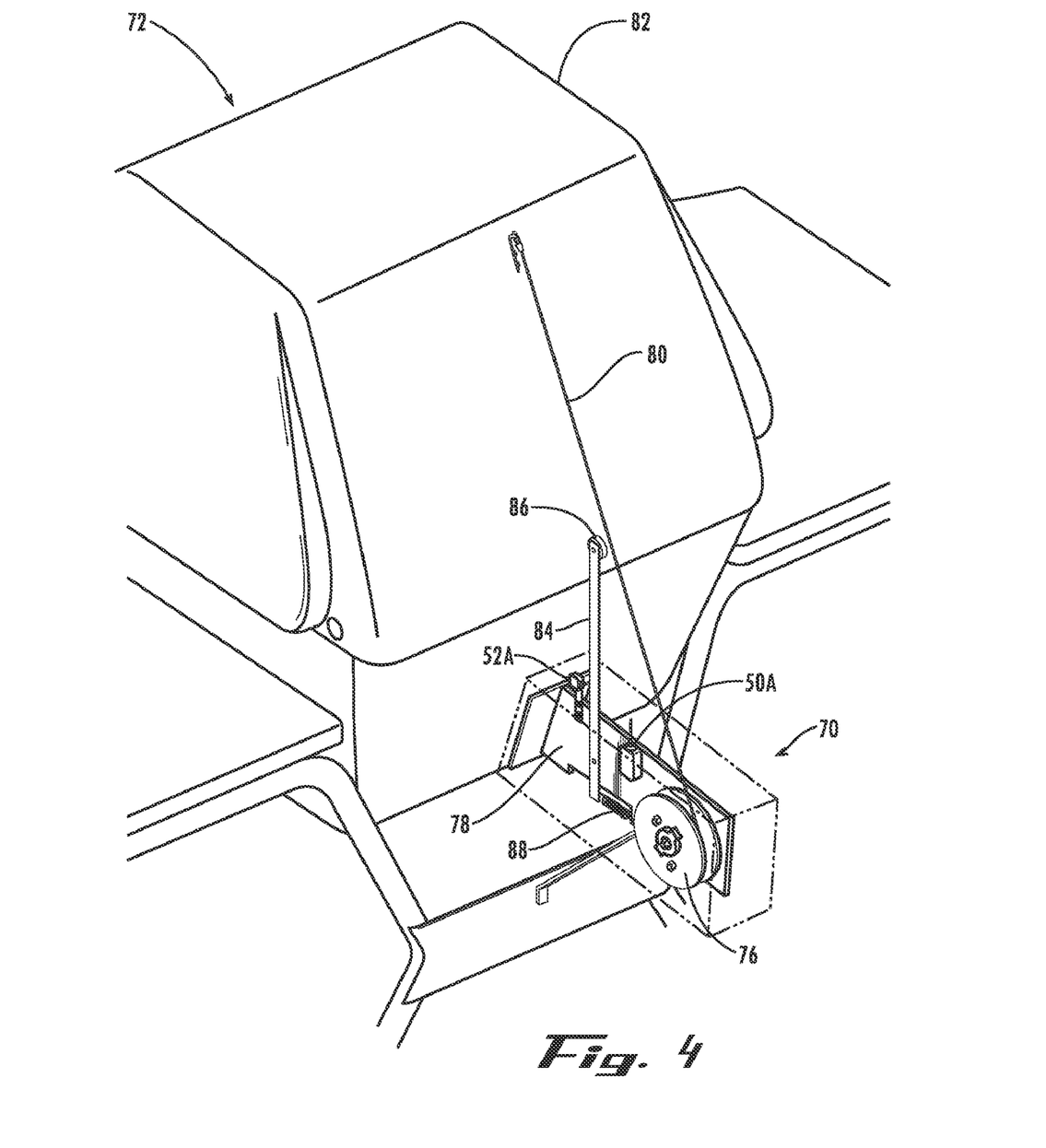
FIG. 4 is perspective view of a grill with an attached apparatus for opening and closing the grill lid in accordance with another embodiment of the present invention.
Figure 5:
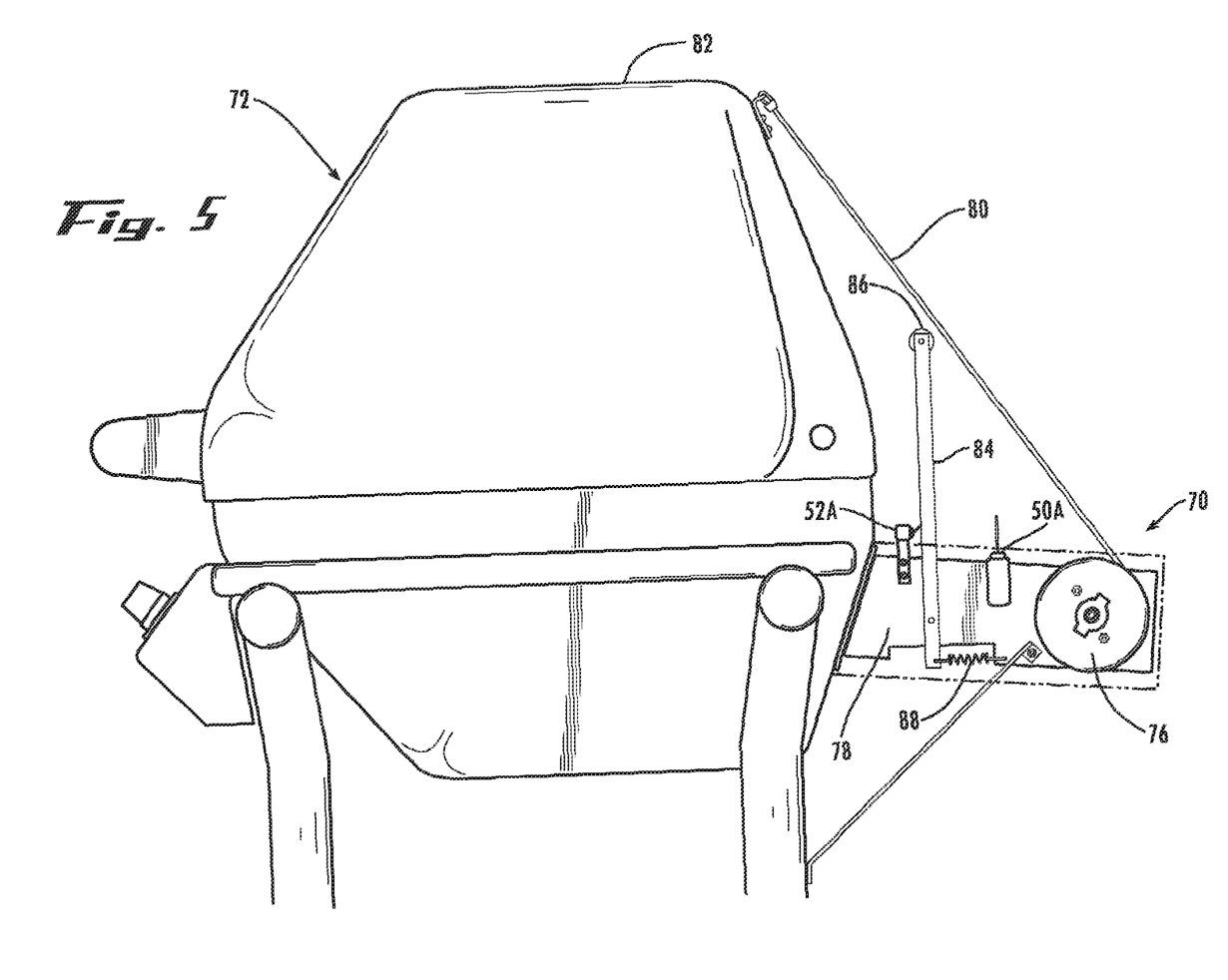
FIG. 5 is a side elevational view of the grill and attached apparatus of FIG. 4.
Figure 6:
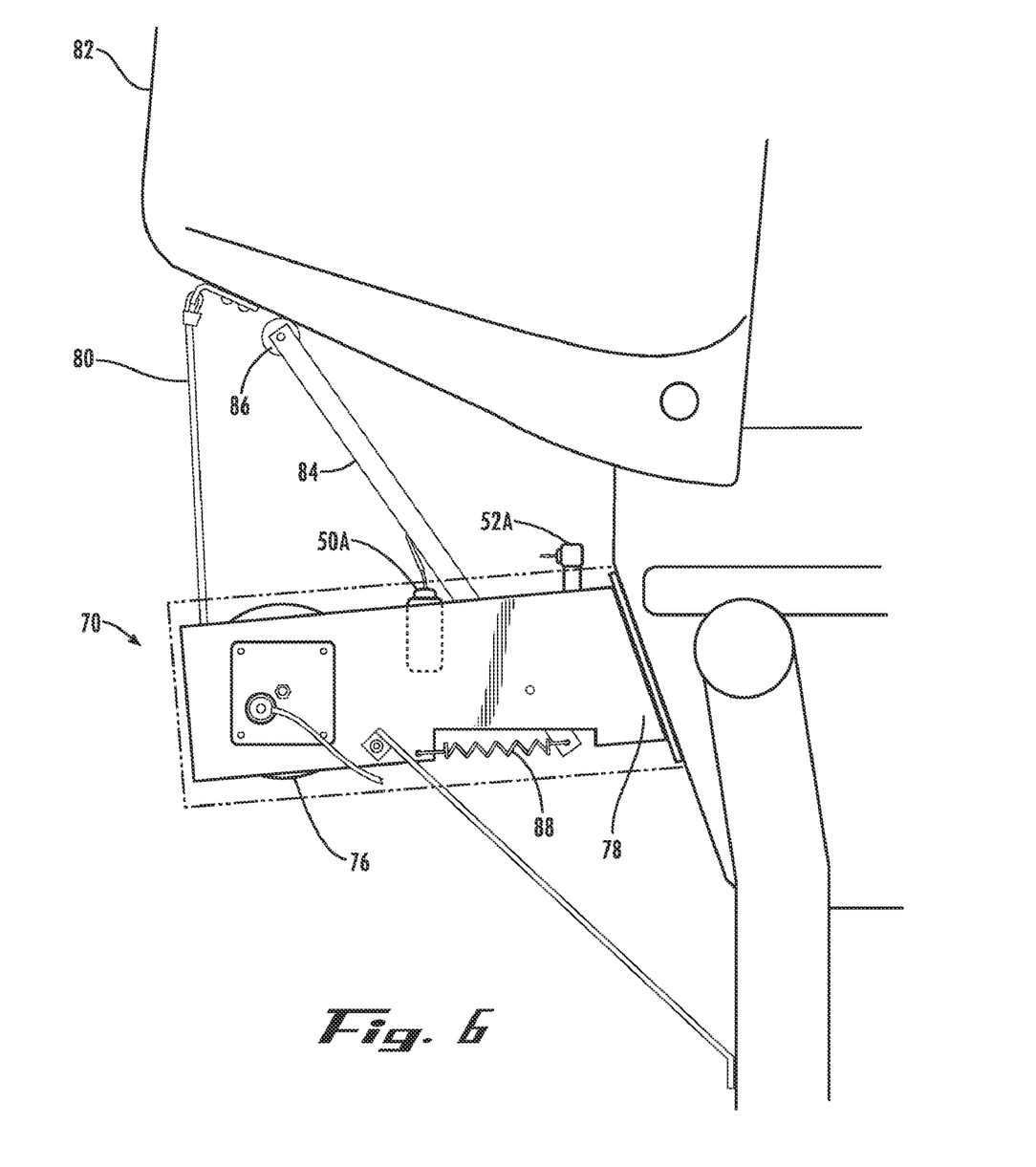
FIG. 6 is side elevational view similar to FIG. 5 but from the opposite side of the grill and showing the lid in an opened position.

An alternative embodiment of the invention is illustrated in FIGS. 4-6. As in the embodiment described above with regard to FIGS. 1-3, an actuator system 70 is mounted to a grill 72 and electrically connected to a controller system, which is not shown in FIGS. 4-6 for purposes of clarity but which can be the same as controller system 14 (FIG. 7) described above with regard to the other embodiment, including a photoelectric eye or other electronic sensor mounted in a suitable position on grill 72. Actuator system 70 includes a suitable motor 74 (best shown in FIG. 6) coupled to a drive pulley 76. Motor 74 and pulley 76 are mounted to a bracket 78, which in turn is bolted to the rear of grill 72 in the same manner as in the above-described embodiment. These elements can be enclosed in a heat-resistant safety enclosure or shroud (indicated in dashed line).

One end of a cable 80 is taken up by pulley 76, and the other end is attached to the upper portion of the rear of the lid 82. A closing arm 84 pivots on bracket 78 and has a heat-resistant roller 86 at its distal end and a tension spring 88 extending between its proximal end and bracket 78.

In operation, when a user approaches grill 72, the electronic sensor activates the relay circuitry of controller system 14 in the same manner as in the above-described embodiment. In response, the circuitry powers motor 74 in a direction that reels in some of cable 80, thereby pulling lid 82 open. When lid 82 is in the fully closed position, arm 84 engages a limit switch 52A, which is of the same type and connected in the circuitry in the same manner as limit switch 52 of the above-described embodiment. When lid 82 reaches the fully opened position (see FIG. 6), it engages a limit switch 50A, which is of the same type and connected in the circuitry in the same manner as limit switch 50 of the above-described embodiment. This causes the circuitry to cease powering motor 74. As in the above-described embodiment, motor 74 remains in the fully opened position until the user depresses the foot pedal switch (see FIG. 7). In the fully opened position, spring 88 biases arm 84 against the rear of lid 82. In response to the user depressing the foot pedal switch, the circuitry powers motor 74 in the opposite direction, thereby allowing some of cable 80 to unreel from pulley 76 as arm 84 pushes lid 82 closed. When lid 82 reaches the fully closed position, it again engages limit switch 52A, which causes the circuitry to cease powering motor 74.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. An apparatus for opening and closing a cooking grill having a hinged lid, comprising:
  an actuator system mountable to the grill and having a means for transmitting motion to the lid; and
  a controller system having an electronic sensor and a pneumatic foot pedal, the controller system causing the actuator system to move the lid to an open position when the electronic sensor detects a person near the grill and causing the actuator system to move the lid from the open position to the closed position when the foot pedal is activated.

2. The apparatus claimed in claim 1, wherein the means for transmitting motion comprises a cable.

3. The apparatus claimed in claim 2, wherein the actuator system comprises a gearmotor having a pulley transmitting motion to the cable.

4. The apparatus claimed in claim 1, wherein the means for transmitting motion comprises an arm.

5. The apparatus claimed in claim 4, wherein the arm includes a roller made of a ceramic material at a distal end contacting the lid.

6. The apparatus claimed in claim 4, wherein the means for transmitting motion further comprises a spring for biasing the arm against the lid.

7. The apparatus claimed in claim 1, wherein the actuator system includes an insulative mounting for mounting the actuator system to a body of the grill.

8. The apparatus claimed in claim 1, wherein the electronic sensor comprises a photoelectric sensor.

9. The apparatus claimed in claim 1, wherein the controller system comprises a DC power supply system supplying power to the actuator system.

10. The apparatus claimed in claim 9, wherein the power supply system receives household utility power.

11. The apparatus claimed in claim 9, wherein the power supply system receives battery power.

12. A method for opening and closing a cooking grill having a hinged lid, comprising the steps of:
photoelectrically detecting a person near the grill;
in response to detecting a person near the grill, causing an actuator system to move the lid from a closed position to an open position; and
in response to detecting activation of a user-activated pneumatic foot pedal, causing the actuator system to move the lid from the open position to the closed position 13. The method claimed in claim 12, further comprising the step of causing the actuator system to move the lid from the open position to the closed position.

14. The method claimed in claim 13, wherein the step of causing the actuator system to move the lid from the open position to the closed position comprises the steps of:
detecting activation of a user-operable switch; and
in response to detecting activation of the user-operable switch, causing the actuator system to move the lid from the open position to the closed position.

15. An improvement to a grill of the type comprising a base and a lid hingedly connected to the base, the improvement therein comprising:
an actuator system mounted to the grill to move the lid from a closed position to an open position;
an electronic sensor communicatively coupled to the actuator system, wherein the sensor senses a person near the grill and relays a signal to the actuator system to open the lid; and
a switch to move the lid from the open position to the closed position, wherein the switch is pneumatically activated.

* * * * *